United States Patent [19]

Rondel et al.

[11] Patent Number: 4,984,177
[45] Date of Patent: Jan. 8, 1991

[54] VOICE LANGUAGE TRANSLATOR

[75] Inventors: Stephen A. Rondel, Redmond; Joel R. Carter, Mukilteo, both of Wash.

[73] Assignee: Advanced Products and Technologies, Inc., Redmond, Wash.

[21] Appl. No.: 306,001

[22] Filed: Feb. 1, 1989

Related U.S. Application Data

[63] Continuation-in-part of Ser. No. 152,903, Feb. 5, 1988, abandoned.

[51] Int. Cl.$^5$ .............................................. G10L 5/00
[52] U.S. Cl. ................................ 364/513.5; 364/419; 364/900
[58] Field of Search ................. 381/52; 364/513.5, 419

[56] References Cited

U.S. PATENT DOCUMENTS 4,507,750  3/1985  Frantz et al.

FOREIGN PATENT DOCUMENTS 2014765  11/1978  United Kingdom.

Primary Examiner—Emanuel S. Kemeny
Attorney, Agent, or Firm—Christensen, O'Connor, Johnson & Kindness

[57] ABSTRACT

A voice language translator, suitable for implementation in hand-held size, is disclosed. The voice language translator includes: a key pad (20); a display system (17); a language cartridge(s) (45); a voice recognition module (49); a voice synthesizer (47); a speaker (39); a microphone (41); and a programmed CPU (43). Prior to use as a translator, the voice language translator is trained to the voice of a user. During training, a series of words and phrases to be spoken by the user are displayed, or spoken, in the language of the user. As the user speaks the words and phrases, the voice recognition circuit produces a digitally coded voice pattern that uniquely identifies the way in which the user spoke the words and phrases. The voice patterns produced by the voice recognition circuit are analyzed and stored, preferably in the cartridge. Thereafter, during translation, when the user speaks a sentence, the voice pattern produced by the voice recognition circuit is compared with the stored voice patterns to determine the nature of the spoken sentence. The result of the comparison is used to locate equivalent translations stored in the cartridge. Preferably, only sentences in the form of instructions or questions are translatable. Also, preferably, each question or instruction ends with a specific word unrelated to the content of the question, such as PLEASE. Strings of words and phrases that make up sentences are combinable only in a logical manner. Illogical combinations of words and phrases are ignored. This is accomplished by creating "banks" of combinable words and phrases in memory, and controlling via the CPU program the pathways therebetween such that only logical combinations are creatable. If the translator does not understand a spoken word or phrase, a list of acceptable words and phrases is displayed. Positioning a cursor adjacent the desired word or phrase and depressing an enter key allows the desired word or phrase to be selected. The logical string combinations of equivalent translations are converted to audible sounds by the voice synthesizer and emitted by the speaker. If desired, a visual display, or an audible emission, in the language of the user can be made to occur before the translated emission takes place (or simultaneously with the translated emission) so that the user can be certain that the sentence to be translated has been accurately interpreted by the voice language translator. The voice language translator also includes provisions for testing "trained" words or phrases and correcting erroneous training. Further, the voice language translator includes provisions for transferring "trained" voice patterns from one translation cartridge (e.g., an English-to-French cartridge) to another translation cartridge (e.g., English-to-French cartridge).

24 Claims, 10 Drawing Sheets 4,984,177

VOICE LANGUAGE TRANSLATOR

RELATION TO OTHER APPLICATIONS

This application is a continuation-in-part of U.S. patent application Ser. No. 152,903, filed Feb. 5, 1988, and entitled "Voice Language Translator."

TECHNICAL AREA

This invention is directed to language translation and, more particularly, a voice language translator for translating words spoken in one language to spoken words in another language.

BACKGROUND OF THE INVENTION

In recent years, travel between countries for both business and pleasure has increased dramatically. One difficulty associated with intercountry travel (which also forms an impediment to increasing such travel) is the language barrier. More specifically, the countries of the world are inhabited by people who speak a wide variety of different languages and dialects, only a few of which are understood by even the most sophisticated traveler. The difficulties associated with reading documents in a foreign language, and conversing with another who does not understand the speaker's language and whose language the speaker does not understand, creates the language barrier referred to above.

As computer systems have gained in power, as a result of increases in processing speed and memory capacity, more attention has been given to using computers to translate written words from one language to another. Unfortunately, while some notable success has been achieved in this area, little attention has been given to the use of computers for voice translation, i.e., to translate words spoken in one language to spoken words in another language. As a result, travelers have been forced to continue to rely on a language dictionary or foreign phrase book. While convenient from a size point of view, language dictionaries and foreign phrase books are extremely difficult and time consuming to use, and require both memorization and annunciation skills. The present invention is directed to overcoming the foregoing and other problems associated with translating spoken words from one language to another. More specifically, the invention is directed to providing a voice language translator suitable for implementation in hand-held size that rapidly and accurately translates words spoken by a user in one language to spoken words in another language.

SUMMARY OF THE INVENTION

In accordance with this invention, a voice language translator suitable for implementation in hand-held size is disclosed. The voice language translator includes: a key pad; a display system (which may be optional); a language cartridge(s); a voice recognition module; a voice synthesizer; a speaker; a microphone; and a programmed central processing unit (CPU). Prior to use as a translator, the voice language translator is "trained" to the voice of a user. The level of training required is a function of the degree of speaker independence in the voice recognition circuit. More specifically, prior to use as a translator, the programmed CPU sequentially displays, or speaks, in the user's language, a series of words and phrases stored in the language cartridge along with instructions to the user to speak the words or phrases as they appear. When the user speaks the words or phrases, the voice recognition circuit produces a digitally coded voice pattern that uniquely identifies the way in which the user spoke the word or phrase. The voice patterns produced by the voice recognition circuit are analyzed and stored, preferably in the cartridge. Thereafter, when the user speaks a word or phrase, the output of the voice recognition circuit is compared with the stored voice patterns to determine the nature of the word or phrase spoken. The spoken words or phrases are used to locate equivalent translations stored in the cartridge. Strings of equivalent words or phrases are combined in a logical manner to create sentences, such as "Take me to the... Paris opera house." in the translation (i.e., foreign) language. Illogical combinations of words or phrases are rejected because they are not among the allowable combinations of words and phrases for which voice patterns have been stored. The logical string combinations of equivalent translations are converted to auidible sounds by the voice synthesizer and emitted by the speaker. If desired, a visual display and/or an audible emission in the language of the user, can be made to occur before the translated emission takes place (or simultaneously with the translated emission) so that the user can be certain that the sentence to be translated has been accurately interpreted by the voice language translator. Visual displays have the advantage that they can include a foreign spelling of the sentence to be spoken.

In accordance with further aspects of this invention, while the logical string combinations can be in various sentence forms, they are in the form of instructions, or questions requiring YES, NO, name, number or time answers. Still further, preferably, each instruction or question ends with a specific word that is tonally and contextually unrelated to the instruction or question, such as PLEASE. The requirement that an ending term be spoken lets the translator know when the string combination to be translated has ended and translation is to begin. The ending term may or may not be translated. A select few single words, such as THANK YOU, GOODBYE, etc., may be included for translation without the ending word restriction.

In accordance with other aspects of this invention, many of the words and phrases available for translation are stored in banks. Each bank includes a series of words or phrases falling in the same category, such as a series of related infinitive phrases (e.g., to see, to reserve, etc.), persons a traveler may want to see (e.g., doctor, dentist, police officer, porter, etc.), or places a traveler may want to go (e.g., hotel, airport, restaurant, etc.). Alternatively, or in addition, the banks may include words or phrases a business person may need to create "business"-related sentences. The CPU program controls the voice language translator such that only banks containing words or phrases that can be combined in a logical manner are accessible during translation. Banks containing illogical words or phrases are not accessible. For example, a bank containing food items, e.g., fish, meat, etc., would not be available when the introductory term is "Take me to . . . the", whereas banks containing destinations, e.g., hotel, airport, etc., or persons, e.g., manager, doctor, etc., would be available. Preferably, the voice language translator has the capability of displaying a list of the phrases or words from available banks for use in instances where the translator does not understand a spoken word or phrase or where the user does not recall what his next options are. Also, preferably, in such instances a user can select the desired word or phrase by use of a cursor or highlight and add the selected word or phrase to an instruction or question being assembled by actuating an enable key, or speaking an enabling word. This allows poorly trained words and phrases to be selected and/or words or phrases to be selected when background noise makes voice recognition difficult to achieve.

In accordance with still other aspects of this invention, the words or phrases stored in the banks are chosen to be as phonetically spaced apart as possible. Further, a user is instructed to pronounce terms that sound somewhat similar (e.g., "a" and "the") in a dialectically distinguishable manner (i.e., as "a" and "the").

In accordance with yet still further aspects of this invention, the translator includes a backspace key the actuation of which eliminates the last understood section of a sentence. Actuation of the backspace key when the words "Take me to . . . an . . . " have been understood would eliminate the word "an" and retain "Take me to", allowing the user to complete the sentence "Take me to the airport" without destroying "Take me to".

In accordance with yet other aspects of this invention, the voice language translator can be operated to test "trained" words or phrases to determine if the voice language translator correctly understood the words or phrases spoken during the training sequence, or if the user correctly spoke them. If some of the words or phrases were not correctly understood or spoken, the voice language translator can be operated to correct the erroneous training.

In accordance with other still further aspects of this invention, the voice language translator is operable to transfer "trained" voice patterns or other activation utterances from one translation cartridge (e.g., an English-to-French cartridge) to another translation cartridge (e.g., an English-to-German cartridge) in order to avoid retaining of the activation (e.g., English) utterances.

In accordance with still yet other aspects of this invention, the voice language translator can be used as a training tool to teach a user how to speak foreign language statements. Also the display can be used to display the written language equivalent.

As will be readily appreciated from the foregoing description, the invention provides a voice language translator. The unique way in which the voice language translator combines banked words and phrases minimizes memory requirements and increases accuracy, making the voice language translator ideally suited for usable implementation in hand-held form. That is, using strings of combinable words and phrases rather than storing entire word/phrase combinations minimizes memory requirements while maximizing the number of available translations because memory duplication is avoided. Restricting to banks the total number of patterns to be searched for acceptable words and phrases increases accuracy and reduces response time. More specifically, in essence, the voice language translator uses a hierarchy or decision tree approach that combines "trained" words or phrases in a logical manner to produce sentences (preferably instructions or questions) to be emitted in the translation (i.e., foreign) language. Depending upon the language, the nature of the sentence, and the desire to minimize storage duplication or activation utterance, the spoken words can be used to locate equivalent words in the translation language and the equivalent words combined, or the spoken words can be first combined into a whole sentence or part of a sentence in the language of the user and the sentence or part of a sentence used to locate an equivalent sentence or part in the translation language. The latter approach minimizes storage requirements and can shorten activation utterances. The total approach maximizes the number of statements that can be formed and translated. Common phrases such as "where is" and "take me" can be logically combined with other common phrases or words such as "a restaurant," "a hotel," "the train to," "Berlin," etc., to create sentences such as "Where is a restaurant?", "Where is a hotel?", "Take me to a restaurant.", "Take me to a hotel.", and "Where is the train to Berlin?" Memory capacity and, thus, the size of a voice language translator incorporating the invention are minimized because many of the phrases and words (e.g., "Where is", "Take me to the", "hotel", etc.) are combinable in different ways to form different sentences. Because nonlogical combinations such as "Bring me the hotel", as opposed to "Take me to the hotel", are rejected, embarrassment on the part of the user is minimized, if not entirely avoided. In essence, the system uses elements of artificial intelligence to determine the probability of correctness of a combination, sometimes in combination with a knowledge of the context. Preferably, the portion of the cartridge memory in which voice patterns are stored is a random access memory the storage of which can be maintained by a small battery for extended periods of time such as a CMOS RAM. As a result, cartridges can be interchanged in the voice language translator without loss of the voice patterns stored in removed cartridges. This not only saves the time to retrain for different languages, it also allows multiple users, such as a husband and wife, or members of a business group, to use the same voice language translator with different cartridges that have been "trained" to respond to the sound of each different user. In addition to voice translation, the voice language translator can be utilized to help educate a user to speak foreign language sentences. All a user needs to do is speak and/or scroll to create a translatable sentence in his native language and listen to and repeat the translation uttered by the voice language translator or spelled by the display.

BRIEF DESCRIPTION OF THE DRAWINGS

The foregoing and other features and advantages of the present invention will become more readily appreciated as the same becomes better understood by reference to the following detailed description when taken in conjunction with the accompanying drawings wherein.

DESCRIPTION OF THE PREFERRED EMBODIMENT

Figure 1:
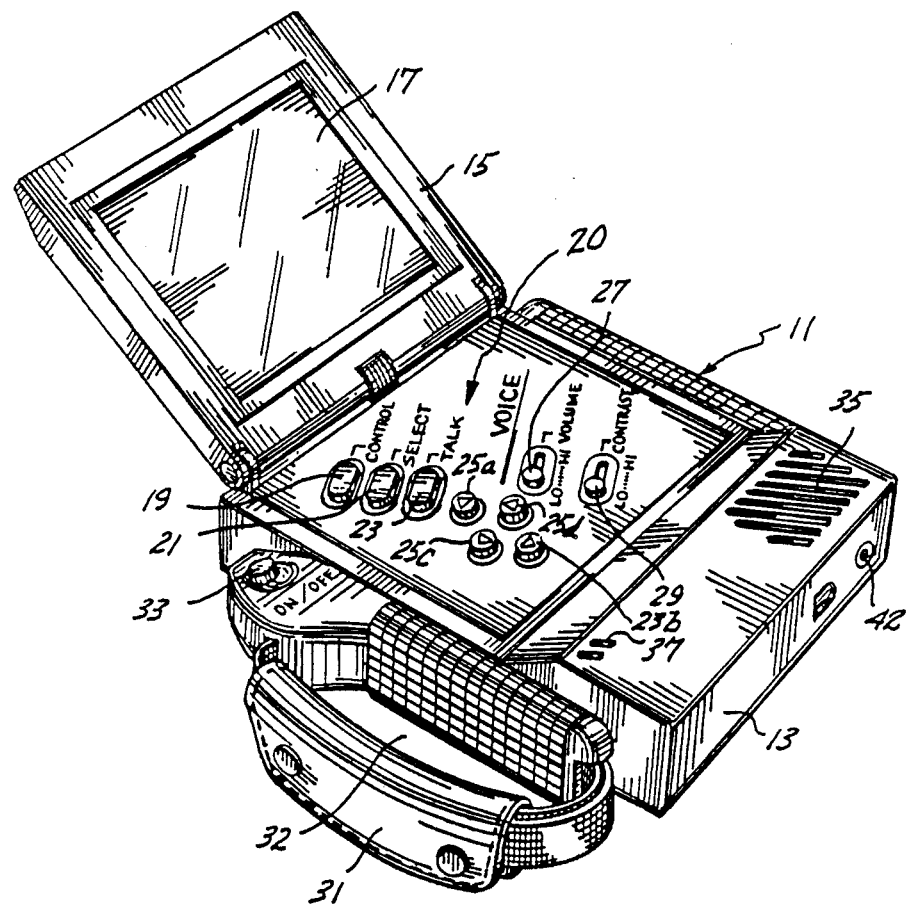
FIG. 1 is an isometric view of a case suitable for housing a voice language translator formed in accordance with the invention.
Figure 2:
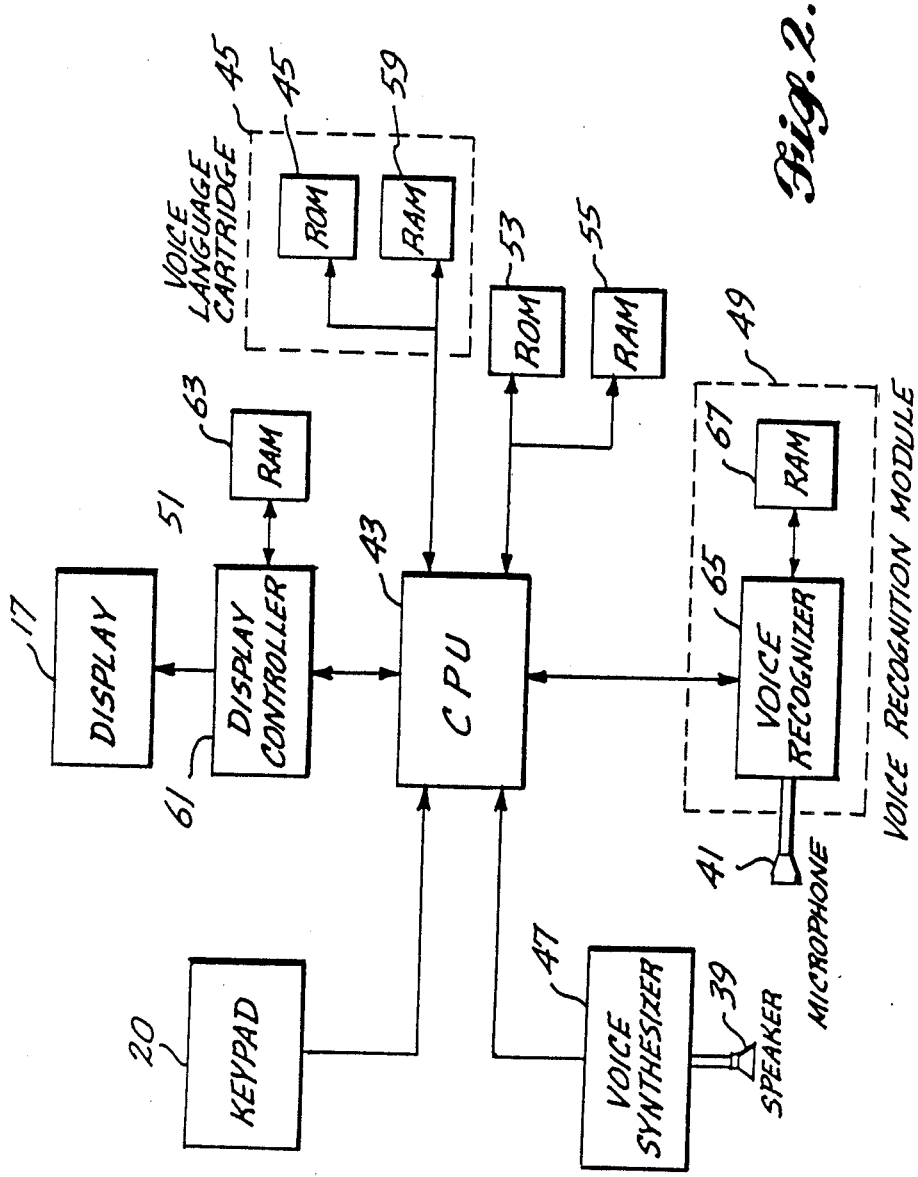
FIG. 2 is a block diagram of the major electronic subsystems of a voice language translator formed in accordance with the invention.

FIGS. 1 and 2 illustrate a voice language translator formed in accordance with the invention. More specifically, FIG. 1 illustrates a case 11 suitable for housing a voice language translator formed in accordance with the invention. The location of certain control keys that form a key pad, and other external elements that interact with microelectronic circuitry mounted in the housing are depicted in FIG. 1. The control keys are within thumb or finger reach of one hand without restricting use of the keys by the other hand. FIG. 2 is a microelectronic functional block diagram illustrating the main subsystems and the interconnections therebetween of a voice language translator formed in accordance with the invention. As will be readily appreciated by those familiar with microelectronic circuitry, FIG. 2 is simplified in the sense that many subcomponents such as interface circuits, central processing unit (CPU) controllers, etc., are not illustrated since such components and their functional operations are well known, described in applications' notes and manufacturers' catalogs and are dependent upon the architecture of the particular CPU chosen to create a specific software-based microelectronic system.

FIGS. 3-9 comprise a functional flow diagram that illustrates both the program that controls the CPU of the voice language translator and the actions of a user interacting with the voice language translator. Thus, FIGS. 3-9 form an interactive functional flow diagram. In order to avoid unduly complicating the flow diagrams, standard steps, such as depressing a specific key to escape from a lower level menu to a higher level menu at any time, are not shown in FIGS. 3-9.

The voice language translator case 11 illustrated in FIG. 1 includes a base 13 and a flip-up cover 15 hinged to one end of the upper surface of the base 13. Mounted in the interior surface of the cover 15, i.e., the surface that is hidden when the cover 15 is closed, is a display panel 17. Preferably, the display panel 17 is a multiline liquid crystal display. In one actual embodiment of the invention, the display is a 16-line, 20480 pixel, 4 inch by 3¼ inch LCD graphic screen display.

Mounted in the upper surface of the base 13 so as to be hidden when the cover 15 is closed is a key pad 20 formed by a plurality of control keys. The control keys include: a cancel key 19; a select key 21; a talk key 23; up, down, left and right cursor keys 25a, 25b, 25c, and 25d; a volume key 27; and, a contrast key 29. Mounted in a handle 31 located along one edge of the base 13 is an on/off key 33, which forms a further element of the key pad 20. Some keys can be combined to create new activations. The handle 31 includes a strap that forms a loop 32 located on one edge of the base 13. The loop is sized to receive the fingers of a user's hand. The cancel, select, talk, cursor and on/off keys 19, 21, 23, 25a, b, c, and d and 33 are positioned such that when the fingers of a user's left hand extend downwardly through the loop 32 and wrap around the bottom of the base the user's thumb is positioned to operate, i.e., depress, these keys. The volume and contrast keys 27 and 29 are designed to be slid back and forth between Hi and Lo positions. In a conventional manner, the depressible keys cause the actuation of underlying keyboard switches when depressed and the slidable keys control the position of potentiometers.

Also located in the upper surface of the base 13, in a region remote from the keys covered by the cover 15 when the cover is closed that is not covered when the cover is closed, is a speaker grill 35 and a microphone grill 37. Mounted in the base 13 beneath the speaker grill 35 and the microphone grill 37 are a speaker 39 and a microphone 41, respectively. A jack 42 allows an external earphone and/or a mouth microphone (not shown) to be connected to the voice language translator case 11.

As illustrated in FIG. 2, the electronic system of the voice language translator includes: a central processing unit (CPU) 43; one or more language cartridges 45; a voice synthesizer 47; a voice recognition module 49; and a display system 51. The CPU is connected to be responsive to the actuation of the control keys that form the key pad 20 by a user via a suitable interface circuit (not separately shown). The CPU 43 is also connected through suitable interface circuits (also not separately shown) to: (a) the display system 51 to control the nature of alphanumeric characters displayed on the face of the display panel 17; and (b) to input and output data buses (or a common input/output data bus) running to the one or more language cartridges 45, the voice synthesizer 47 and the voice recognition module 49. Associated with the CPU are conventional memory elements, such as a read only memory (ROM) 53 and a random access memory (RAM) 55. The audio output of the voice synthesizer is connected to the speaker 39, and the audio input of the voice recognition circuit is connected to the output of the microphone 41. The voice language cartridge(s) are interchangeable items designed to be mounted in slots (not shown) in the housing 11 similar to the way video game cartridges are inserted into slots in home video game control units. The slots in the housing 11 may, for example, be accessed by hingedly mounting the handle 31 along the lower surface of the base 13 so that the handle can be swung downwardly when the slots are to be accessed. As shown, the voice language cartridges include both a read only memory (ROM) 57 and a random access memory (RAM) 59.

The display system 51 includes the display panel 17, a suitable display controller 61 and a random access memory (RAM) 63 for storing the data being displayed. More specifically, in a conventional manner, the display controller receives display instructions from the CPU 43. The display instructions include the alphanumeric data to be displayed as well as the location of specific alphanumeric displays. As required, the display instructions are stored in the display system RAM 63. The voice recognition module 49 includes a voice recognizer 65 and a random access memory (RAM) 67. The voice recognizer is formed by one or more large scale integrated ciruits that combine to form a CPU dedicated, i.e., programmed to recognize or respond to human utterances (i.e., words and phrases) and produce a related digital code.

While separate data buses are illustrated in FIG. 2 as connected to the display system 51, the language cartridge(s) 45, the voice synthesizer 47 and the voice recognition module 49, the data buses could take the form of a single data bus if the CPU chosen for a specific embodiment of the invention requires the use of a common data bus. In this regard, as briefly noted above, the architecture of the specific microelectronic chip chosen to form the CPU 43 will determine the nature of the interface circuitry and other subsidiary chips required to create a working embodiment of the invention, i.e., controller chips, memory chips, etc. Similarly, it is to be understood that subsystems such as the voice synthesizer 47 and the voice recognition module 49 may be formed of a plurality of large scale integrated circuit chips designed to cooperate together to perform voice synthesis and voice recognition functions. In this regard, in one actual embodiment of the invention, the voice recognizer includes two processing units. One of the units is a digital signal processor that converts audio signals into digitally coded voice patterns and stores them in a RAM. The other unit compares the digitally coded voice patterns produced by the first unit with stored digitally coded voice patterns when it receives a suitable command from the CPU 13. Finally, as shown in FIG. 2, the language cartridges used in the preferred embodiment of the invention include two types of memory—a read only memory (ROM) 57 and a random access memory (RAM) 59. The ROM portion of the memory 57 stores data that remains unchanged when the voice language translator is utilized. As will be better understood from the following description, this includes words and phrases in the language of the user, and foreign language equivalents of the logical combinations, as well as all or a substantial part of the applications program used by the voice language translator. The RAM portion of the memory 59 is utilized to store data that is unique to a particular user of the voice language translator. More specifically, as will also be better understood from the following description, the RAM portion of the memory 59 stores voice pattern codes unique to the way a user pronounces the ROM stored words and phrases. Preferably, the RAM portion of the memory 59 is relatively nonvolatile and can be maintained for extended periods by minimal power—a CMOS RAM, for example.

The CPU is controlled by an applications program stored in either the language cartridge ROM 57 or the CPU ROM 53. The language cartridge ROM is preferred since it makes the voice language translator more flexible, i.e., useful to perform other functions. The applications program is illustrated in flow diagram form in FIGS. 3-9. In addition to illustrating the applications program, FIGS. 3-9 illustrate how a user interacts with the program.

Figure 3:
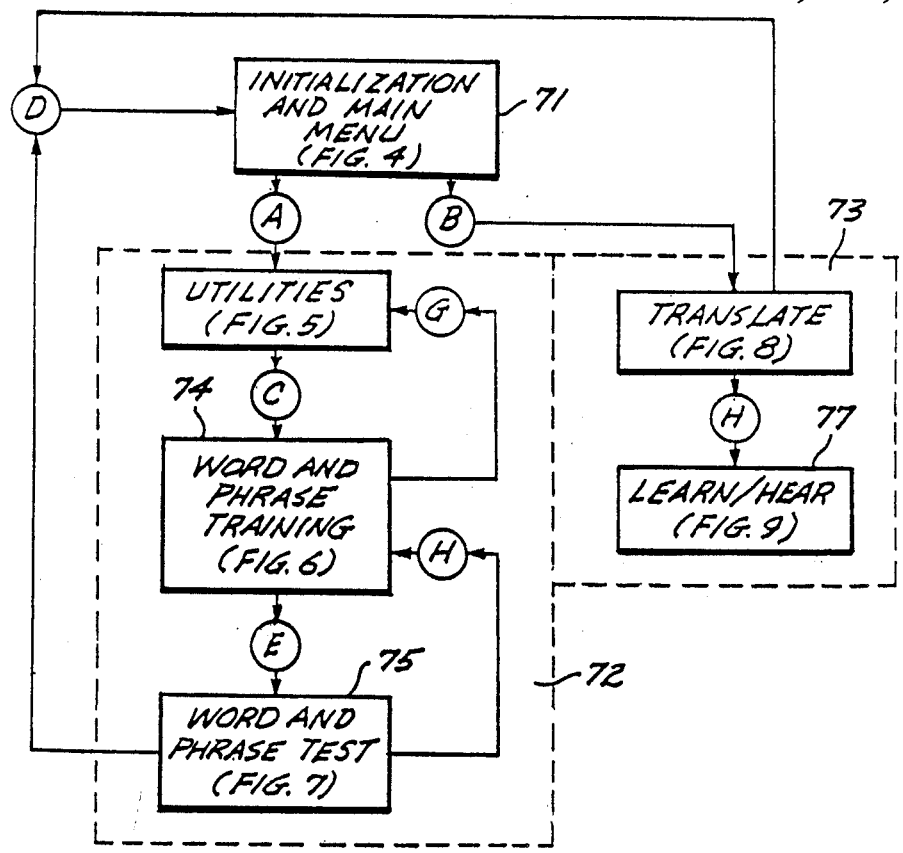
FIG. 3 is a key diagram for the functional flow diagrams illustrated in FIGS. 4–9.

As illustrated in FIG. 3, the applications program includes a plurality of subsections. When the voice language translator is first turned on, by depressing the on/off button 33, an initialization and main menu section 71 illustrated in FIG. 4 and described below is entered. After initialization, a main menu appears on the display panel 17, which requests that the user select one of three modes of operation—a UTILITIES mode of operation 72, illustrated in FIGS. 5, 6, and 7; a TRANSLATE mode of operation 73, illustrated in FIGS. 8 and 9; or a HELP mode of operation, illustrated in FIG. 4. As illustrated in FIG. 3, the UTILITIES mode of operation 72 includes a word and phrase training subsection 74 and a word and phrase test subsection 75. The TRANSLATE mode of operation 73 includes a learn and hear section 77.

Figure 4:
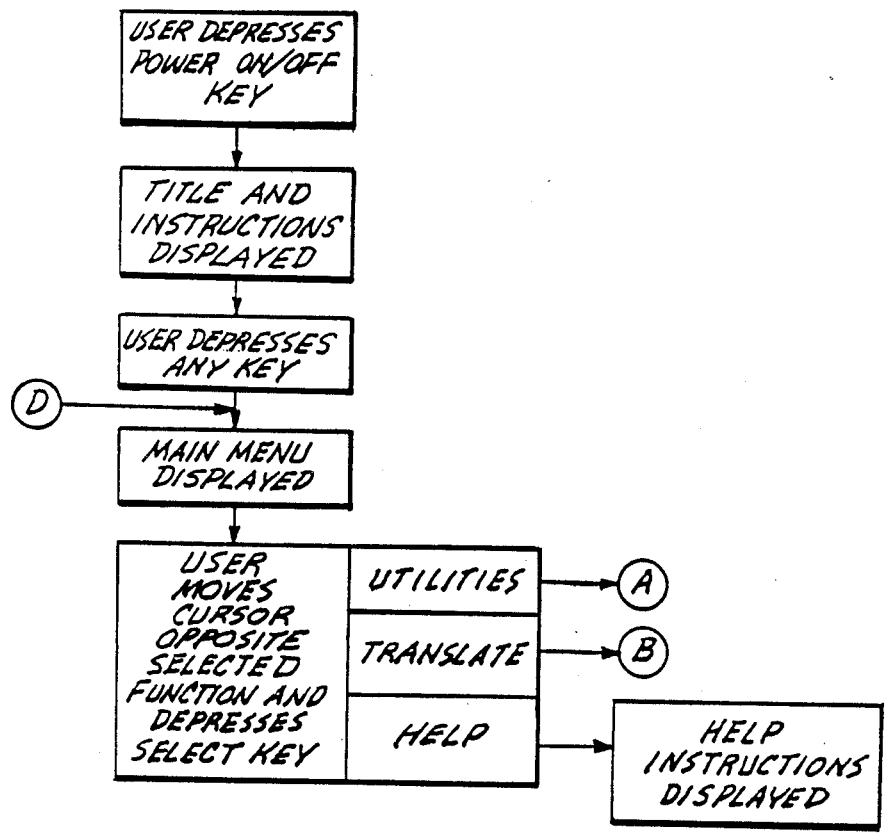
FIGS. 4–9 form an interactive functional flow diagram illustrating the control program of a voice language translator formed in accordance with the invention in combination with the interactive responses of a user of the voice language translator.

As illustrated in FIG. 4, after the user depresses the on/off key 33, title and instructions are displayed after a standard initialization and test subroutine (not shown) is conducted by the CPU. As with many PC application programs, the displayed instructions instruct a user to depress any key to start the operation of the voice language translator applications program. After the user depresses a key, such as the select key, a main menu is displayed. The main menu lists three functions or options, i.e., modes of operation—the UTILITIES mode of operation, the TRANSLATE mode of operation, and the HELP mode of operation. The main menu may also instruct the user to move a cursor opposite the desired option or function and, after being so positioned, depress the select key. Alternatively, such instructions may be contained in a user's manual. Regardless of how such instructions are conveyed to the user, the user uses the cursor keys 25a, 25b, 25c, and 25d to move a cursor opposite the desired option or function and depresses the select key. If the cursor is moved opposite the UTILITIES option, the program cycles to the utilities portion of the program, which, as noted above, is illustrated in FIGS. 5-7 and described below. If the user moves the cursor opposite the TRANSLATE option, the program cycles to the translate portion of the program, which, as noted above, is illustrated in FIGS. 8 and 9. If the user moves the cursor opposite the HELP option and depresses the select key, help instructions are displayed. In a conventional manner, the help instructions are designed to assist the user in the event of difficulty. If the number of lines of help instruction is greater than the number of display lines, the help instructions can be scrolled using the up and down and right and left cursor keys 25a, 25b, 25c and 25d.

Figure 5:
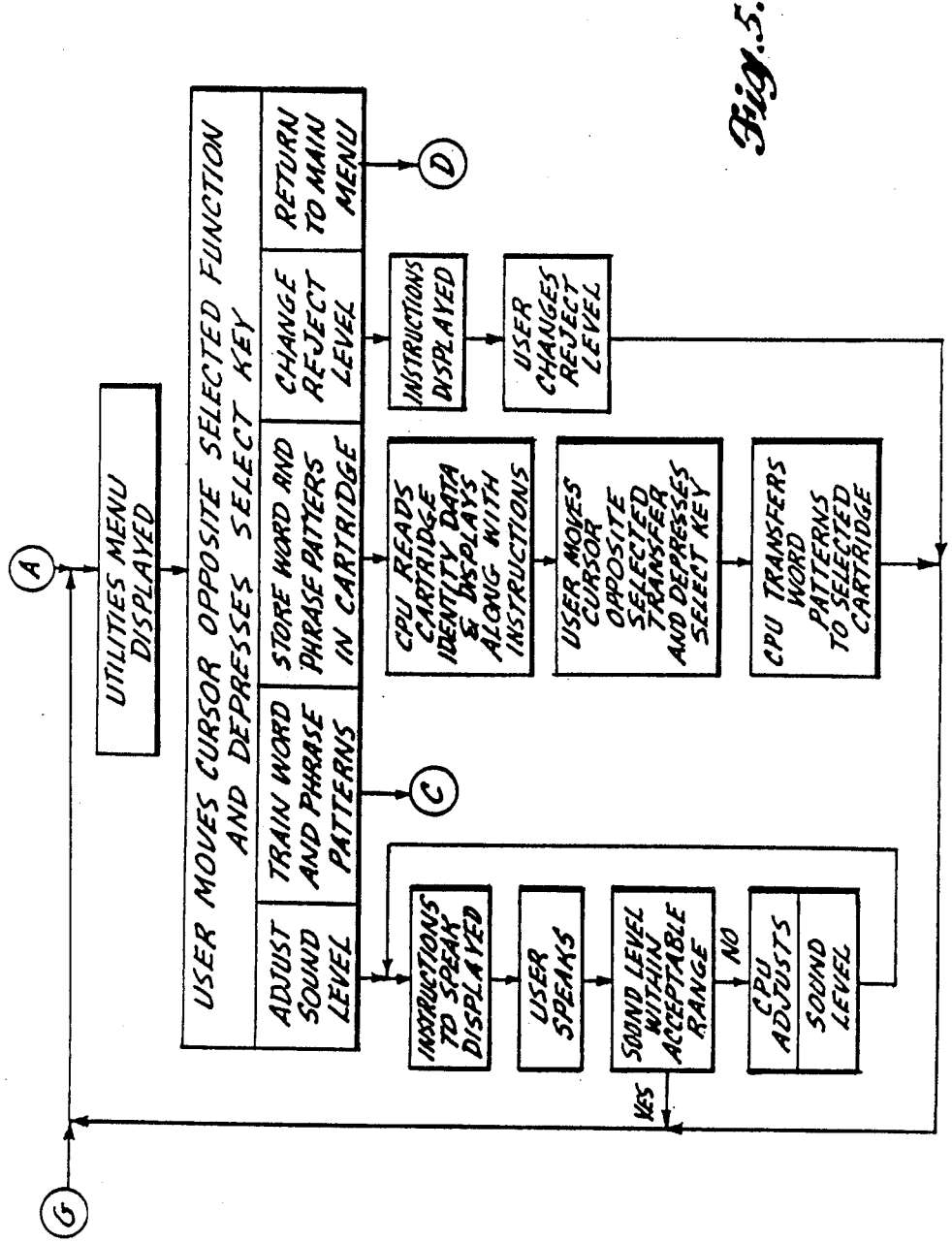

As illustrated in FIG. 5, the first step in the utilities portion of the voice language translator program is to display a utilities menu. The utilities menu includes five options—ADJUST SOUND LEVEL; TRAIN WORD AND PHRASE PATTERNS; STORE WORD AND PHRASE PATTERNS IN CARTRIDGE; CHANGE REJECT LEVEL; and RETURN TO MAIN MENU. The utilities menu may also include instructions that instruct the user to move the cursor opposite the desired option or function, and depress the select key; or such instructions may be contained in a user's manual. In any event, if the user moves the cursor opposite the ADJUST SOUND LEVEL function or option and depresses the select key, instructions to speak are displayed. After the user speaks, the CPU tests the sound level of the audio signal applied to the voice recognition module 49 by the microphone 41. If the sound level is within an acceptable range, the program cycles to the point where the utilities menu is displayed. If the sound level is outside an acceptable range, the CPU adjusts the sound level up or down by increasing or decreasing the output of an audio amplifier that forms part of the voice recognizer. Thereafter, instructions to the user to respeak are displayed. This loop is repeated until the sound level lies within the acceptable range. Adjustment of the audio sound level sets the user's speech level and prevents the voice recognition module from receiving excessively high or excessively low sounds when the voice language translator is trained or used to translate in the manners described hereinafter.

Figure 6:
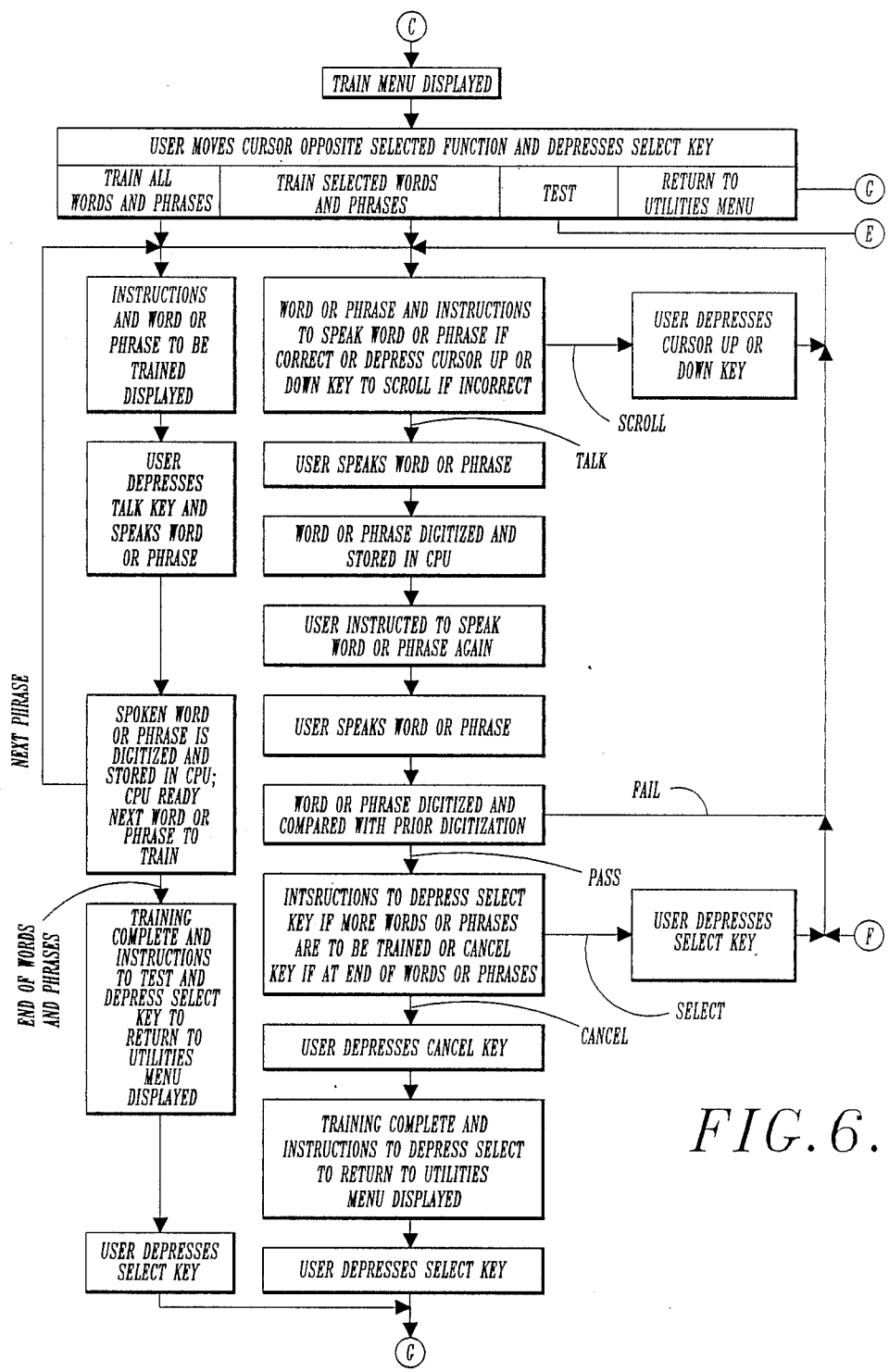

If the user moves the cursor opposite the TRAIN WORD AND PHRASE PATTERNS function or option and depresses the select key, as illustrated in FIG. 6, a train menu is displayed. The train menu includes four options—TRAIN ALL WORDS AND PHRASES; TRAIN SELECTED WORDS AND PHRASES; TEST; and RETURN TO UTILITIES MENU. Instructions to the user to move the cursor opposite the desired option or function, and depress the select key 21, may be displayed along with the train menu; or such instructions may be contained in an accompanying manual. In any event, if the TRAIN ALL WORDS AND PHRASES function or option is selected, the user moves the cursor opposite this option and depresses the select key. Thereafter, instructions and the first one of a long sequence of words and phrases stored in the ROM 57 of a voice language cartridge 45 installed in the case 11 of the voice language translator are displayed. In this regard, preferably, the case includes slots for simultaneously receiving at least two voice language cartridges—an English-to-French cartridge and an English-to-German cartridge, for example. One cartridge will automatically be connected to the CPU when the on/off key 33 is first depressed. The particular cartridge will be identified when the main menu is displayed. Other cartridges mounted in the voice language translator case 11 may also be identified on the display when the main menu is displayed. If another cartridge is to be used, cursor positioning and depression of the select switch, or the user uttering a code word can be used to cause the voice language translator to connect the other cartridge to the CPU. For example, if an English-to-German cartridge is connected to the CPU when the on/off switch is first depressed, utterance of the word "French" by the user could be the vehicle to cause a switch to an English-to-French cartridge.

In any event, as illustrated in FIG. 6, if the TRAIN ALL WORDS AND PHRASES function is selected and the select key depressed, the first of a series of words or phrases to be trained is read from the cartridge connected to the CPU and displayed in the language of the user. Accompanying the word or phrase are instructions to the user to speak the word or phrase. Thereafter, the voice language translator waits for the user to follow these instructions. When spoken, the word or phrase is detected by the voice recognition module, which creates a digital representation of the spoken word or phrase, i.e., a digitally coded voice pattern, that uniquely represents the way the word or phrase was spoken by the user. The thusly generated voice pattern is stored in the RAM memory of the voice language cartridge. Then the user is again instructed to speak the same word or phrase. The respoken word or phrase is digitized and the digitization is compared with the prior digitization. If the match criteria is not met, the program cycles to the point where the user was first instructed to speak the word or phrase. Preferably, the digitized words are compressed, as well as digitized in order to minimize memory storage space.

If the match criteria is met, the CPU reads from the cartridge memory the next word or phrase to be trained. The next word or phrase to be trained is then displayed in the language of the user, along with the instructions for the user to depress the talk key and speak the word or phrase. The program cycles through these loops until all of the words and phrases to be "trained" have been displayed, spoken, digitized and stored in the RAM memory of the voice language cartridge. In this manner, the voice language translator is "trained" to the voice of a user. More specifically, individuals pronounce words in different manners. The voice recognition module will digitize the same word or phrase in different ways, depending upon how it is spoken by a user, thereby allowing for the unique dialect of annunciation characteristics of a user to be understood. Training the voice language translator to a user's voice allows the digitally coded voice pattern produced by the voice recognition module, when the word or phrase is later spoken by the user, to be used to determine which phrase or word was spoken by the user by simply comparing digitally coded voice patterns. In this way, the voice language translator is able to recognize words or phrases to be translated.

In one actual embodiment of the invention, approximately 500 words or phrases are stored in a cartridge and digitized in the manner just described. Included are phrases such as "where is," "take me to," "how much is," etc. The words include "the restaurant," "the train," etc. As will be better understood from the following discussion, the 500-some-odd phrases and words are combinable by the voice translator to create complete sentences (instructions or questions), such as "Show me the way to the restaurant.". In the actual embodiment of the invention referred to, the 500 words or phrases are combinable into over 35,000 sentences. As will be readily appreciated by those familiar with microelectronic systems, combining 500 words and phrases to create 35,000 sentences reduces by almost 99% the amount of memory required to store the data necessary to create the 35,000 sentences.

Figure 10:
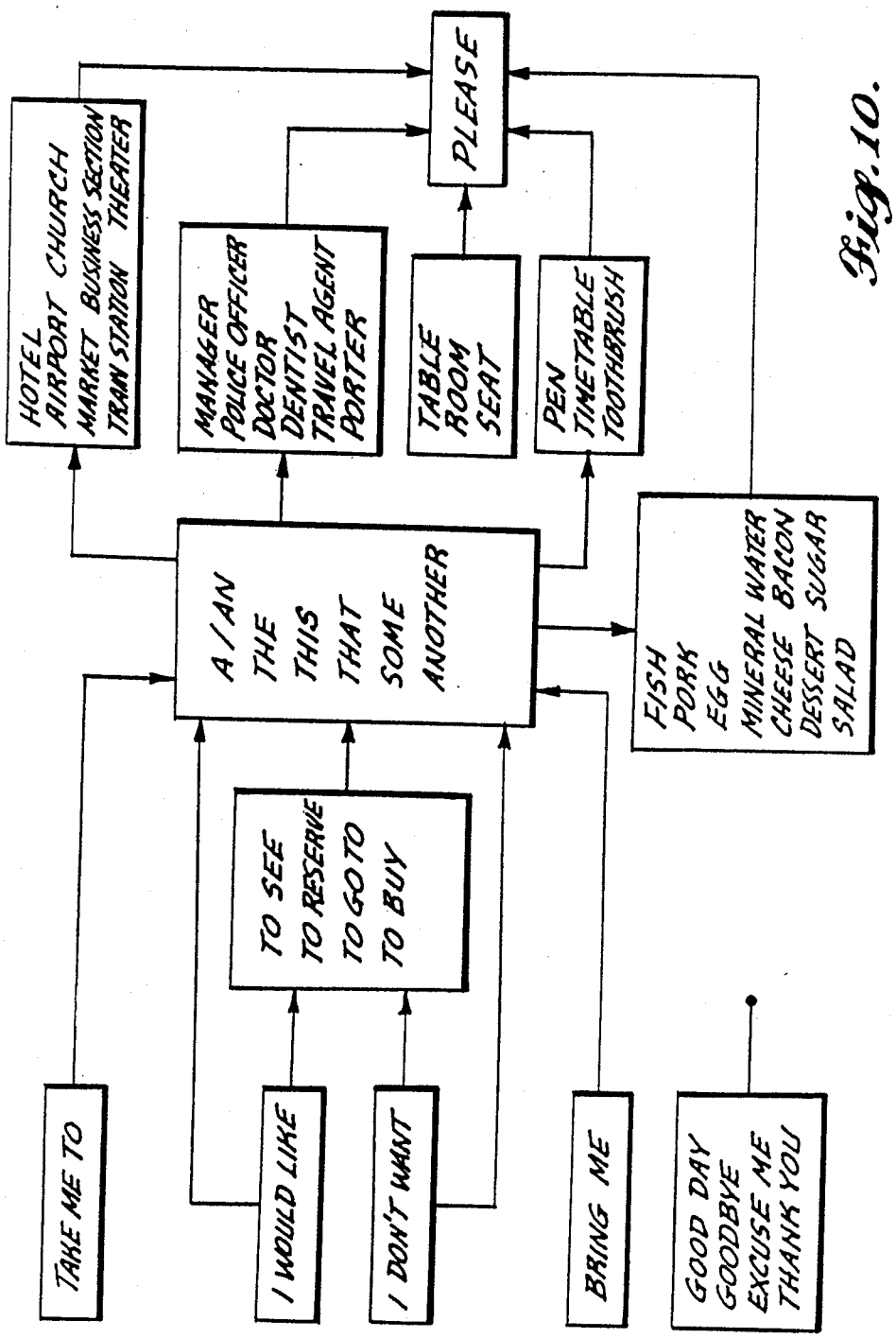
FIG. 10 is a flow diagram illustrating how a portion of the combinable words and phrases are "banked" in memory and the allowable paths between the illustrated word and phrase banks.

Rather than simply going through a sequence of words or phrases in seriatim and storing the related digitally coded voice patterns in the same sequence, the digitally coded voice patterns are stored in memory "banks". More specifically, while the words and phrases to be spoken by the user during training are sequentially displayed, in many instances the associated digitally coded voice patterns are stored in memory sections defined as banks. The words or phrases stored in each bank have some known relationship. They may be a series of related infinitive phrases, such as "to see", "to reserve", etc., or they may be a series of persons a traveler might like to see, such as a "manager", "police officer", "porter", etc. Further they may be a series of places a traveler wants to go to, such as a "hotel", "airport", "theater", etc. FIG. 10 illustrates these and other such banks. Obviously, the banks illustrated in FIG. 10 should be considered as examples, not as limiting the number or types of banks that can be incorporated in actual embodiments of the invention.

After all of the words and phrases stored in the cartridge have been displayed, spoken, digitized and stored in the cartridge memory, a training complete message and instructions to depress the select key to return to the utilities menu are displayed. As illustrated in the lower left-hand corner of FIG. 6, after the user depresses the select key in response to this message, the program cycles to the point in the program where the utilities menu is displayed. Thereafter, if the user so chooses, the program can be cycled to the point where the training menu is displayed so that the user can test whether the training of the words and phrases has been successful.

Figure 7:
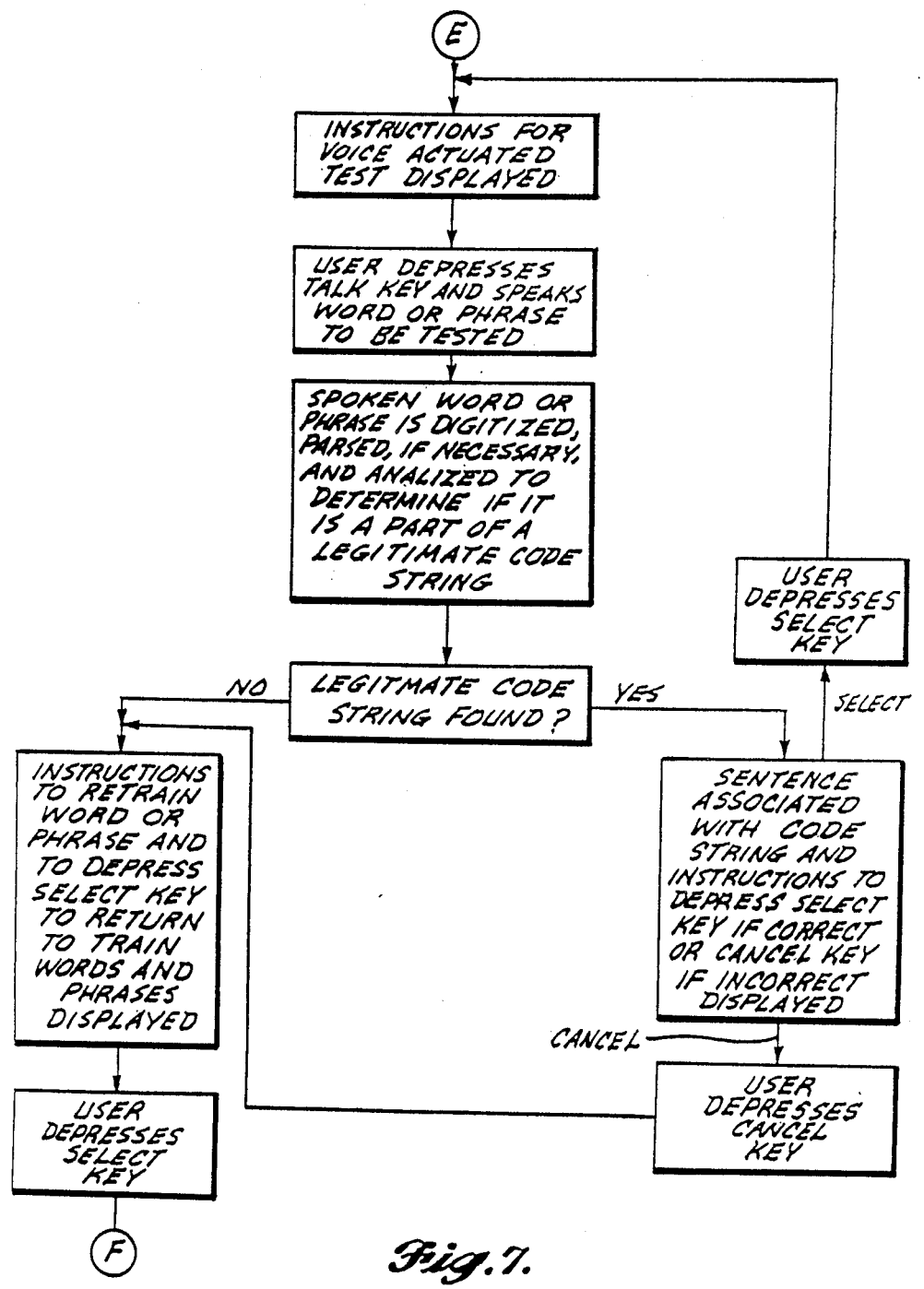

As shown in FIG. 7, if the TEST option or function is selected when the train menu is displayed by the user moving the cursor opposite TEST and depressing the select key, instructions for a voice-actuated test are displayed. The instructions instruct the user to depress the talk key and speak the word or phrase to be tested. After the user complies with the instructions, the spoken word or phrase is digitized, parsed (i.e., broken into sections) if necessary, and analyzed to determine if the word or phrase is part of a legitimate code string. If the word or phrase is not part of a legitimate code string, instructions to retrain the word or phrase are displayed, along with instructions to depress the select key to return to the train words and phrases part of the program. After the user depresses the select key, the program cycles to the start of the TRAIN SELECTED WORDS AND PHRASES option or function, which is described below.

If a legitimate code string is found based on the spoken word or phrase, the sentence associated with the code string and instructions to depress the select key if the sentence is correct or the cancel key if the sentence is incorrect are displayed. If the user depresses the cancel key, the program cycles to the point where instructions to retrain the word or phrase and to depress the select key to return to the train words and phrases subroutine is displayed. If the user depresses the select key, the program cycles to the point where instructions for the voice-actuated test are displayed. While not illustrated in FIG. 7, at any time the user wants to leave the test subroutine, all the user is required to do is depress the cancel key, which is regularly tested by the voice language translator. Depression of the cancel key results in the program cycling to the main menu.

As shown in FIG. 6, when the user moves the cursor opposite the TRAIN SELECTED WORDS AND PHRASES function and depresses the select key (or after depressing the select key to cycle out of the TEST option in the manner described above), the first word or phrase stored in the cartridge is displayed, along with instructions to the user to depress the talk key and speak the word or phrase if correct or depress the cursor up or down key to scroll to another word or phrase if incorrect. If the user depresses the cursor up or down key, a new word or phrase is displayed along with the same instructions. After the user has scrolled to the correct word or phrase, and the user depresses the talk key and speaks the word or phrase, the word or phrase is digitized and stored in the CPU in the same manner that words and phrases were digitized and stored during the TRAIN ALL WORDS AND PHRASES option or function described above. (If the word or phrase is part of a bank, the digitized word or phrase is stored in the correct bank position.) Thereafter, instructions to depress the select key if more words or phrases are to be trained or the cancel key if at the end of the words or phrases are displayed. If the user depresses the select key, the program cycles to the point where a word or phrase is displayed along with instructions to depress the talk key and speak the word or phrase if correct or depress the cursor up or down key to scroll the display occurs. If the user depresses the cancel key, training complete and instruction to depress the select key to return to the utilities menu are displayed. Thereafter, when the user depresses the select key, the program cycles to the point in the voice language translator applications program where the utilities menu is displayed, which is shown in FIG. 5 and described above.

If the user positions the cursor opposite the STORE WORDS AND PATTERNS IN CARTRIDGE option or function when the utilities menu is displayed (FIG. 5) and depresses the select key, the CPU reads cartridge identity data and displays it along with instructions to store words or phrases in the cartridge memory. The instructions include a list of options, such as: (1) transfer trained word and phrase patterns stored in the memory of the voice language translator to the cartridge that held the words and phrases that were trained during the above-described training options or functions (this instruction would occur if the digitized words are temporarily stored in the CPU RAM rather than immediately transferred to the cartridge RAM); or (2) transfer trained word and phrase patterns from one cartridge to another. As in the case of the menu displays described above, the user moves the cursor opposite the desired function and depresses the select key. When this occurs, the CPU performs the selected word pattern transfer. Thereafter, the voice language translator applications program cycles to the point where the utilities menu is displayed.

If the user moves the cursor opposite the CHANGE REJECT LEVEL option or function when the utilities menu is displayed and depresses the select key, change reject level instructions are displayed. This function allows a user, having trouble training the voice language translator to correctly respond to how the user speaks a particular word or phrase, to loosen or tighten the criteria used by the voice recognition module to determine word and phrase matches. More specifically, as noted above, the voice recognition module includes a comparison processing unit that compares spoken voice patterns with stored voice patterns. Such circuits can be adjusted to accept more or less element mismatches when determining if one voice pattern is the same as another. The user can control the acceptable amount of mismatch by using the cursor to increase or decrease the reject level, i.e., the acceptable amount of mismatch. When the cursor is opposite the selected level, the user depresses the select key to cause the level to be stored and the program to cycle to the point when the utilities menu is displayed.

If the user moves the cursor opposite the RETURN TO MAIN MENU function or option when the utilities menu is displayed and depresses the select key, the voice language translator applications program cycles to the point where the main menu is displayed (FIG. 4). If the user moves the cursor opposite the RETURN TO UTILITIES MENU when the train menu is displayed (FIG. 6), and depresses the select key, the voice language translator applications program cycles to the point where the utilities menu is displayed (FIG. 5).

If the user moves the cursor opposite the TRANSLATE function and, when the main menu is displayed (FIG. 4) depresses the select key, a translate menu is displayed. See FIG. 8. The translate menu includes four options or functions-EXPRESS MODE, TRANSLATE, LEARN/HEAR and EXPRESS MODE CANCEL. If the cursor is moved opposite the EXPRESS MODE function and the select key is depressed in accordance with displayed or manual instructions, an express mode flag is set. When the cursor is moved opposite the EXPRESS MODE CANCEL function and the select key is depressed, the express mode flag is cleared.

When the user moves the cursor opposite the TRANSLATE function and depresses the select key, a test is made by the CPU to determine if a cartridge with user-trained voice patterns installed. If no cartridge with user-trained voice patterns is installed, instructions to train voice patterns and depress any key to return to the main menu are displayed. After the user depresses any key, the voice language translator cycles to the main menu (FIG. 4).

If a cartridge with a user-trained voice pattern is installed, the user-trained voice patterns are down loaded to the CPU memory. Thereafter, instructions for voice-actuated translation are displayed. These instructions instruct a user to depress the talk key and speak the sentence the user wants translated. As noted above, the sentence may be a statement or a question. As a user speaks a sentence to be translated, the spoken sentence is digitized by the voice recognition module, parsed (i.e., broken) if necessary into recognition codes and the codes analyzed to determine if they form a legitimate string. In this regard, preferably, sentences are to be spoken with slight pauses between significant sections, such as: "I would like . . . to go to . . . the . . . train station . . . PLEASE". Analysis is performed by comparing the section outputs of the voice recognition module, which may be stored in the voice recognition RAM 67, with the trained voice patterns stored in the voice language cartridge RAM 59. The details of how this is accomplished are illustrated in FIG. 8A and described next.

After the user depresses the talk key, the other keys are tested to determine if any other keys have been pressed. If no other keys have been pressed, the voice language translator waits until a user speaks a word or phrase. When this occurs, the spoken word or phrase is digitized (and compressed if trained words and phrases are compressed) to form a template. The template is then compared to the stored user trained voice patterns of the proper bank(s). See FIG. 10 and the following description. If a match is found, the matching text is displayed (in the language of the user). Then a test is made to determine if more input (i.e., words or phrases) is required to form a complete output sentence. If more input is needed, the program cycles to the point where a test is made to determine if the user has pressed a key. If more input is not needed because, for example, the terminating word "PLEASE" has been spoken, the program cycles to Point L in FIG. 8.

If a match is not found, an error message is printed, i.e., displayed, and a test is made to determine if this is the second consecutive failure of the same match test. If it is not the second consecutive failure, the program cycles to the point where a test is made to determine if the user has pressed a key. If the failure is the second consecutive failure of the same match test, the program cycles to the point where the words (or phrases) in the current word bank are displayed, which is shown on the left side of FIG. 8A and described below.

If the user presses a key after the talk key has been pressed, a test is made to determine if the escape key (i.e., a key designated to perform an escape function) was pressed. If the escape key was pressed, the program cycles to the point in FIG. 8 where the instructions for a voice actuated translation are displayed. If the escape key was not pressed, a test is made to determine if the backup key (i.e., a key designed to perform a back space function) was pressed. If the backup key was pressed, the last recognized word or phrase is cleared from the display and the program cycles to the point where a test is made to determine if the user has pressed a key.

If the backup key was not pressed, a test is made to determine if the select key (i.e., a key designed to perform a select or "help" function) was pressed. If the select key was not pressed, the program cycles to the point where it waits for the user to speak a word or phrase.

If the select key was pressed, the program cycles to the point where the words or phrases in the current bank are displayed. Then the program tests the escape key to determine if it has been pressed. If the escape key is pressed, the program cycles to the point where it waits for the user to speak a word or phrase. If the escape key has not been pressed, the scroll keys are tested to determine if they have been pressed. If the scroll keys have not been pressed, the program cycles to the point where the current bank word or phrase list is displayed. If one of the scroll keys has been pressed, the word list is scrolled upwardly or downwardly, depending upon which key (up or down) has been pressed.

Not only must the sections of the sentence to be translated compare with the trained voice patterns, the section sequence must be logical and acceptable. In this regard, as noted above and illustrated in FIG. 10, the trained voice patterns are stored in "banks". The CPU program "links" the banks in a logical manner. The links for the bank example depicted in FIG. 10 are represented by arrows. If a spoken sentence does not follow one of the paths through the banks depicted by the links, the spoken sentence is rejected, i.e., not displayed and/or translated. For example, "I would like . . . hotel . . . PLEASE" is rejected whereas "I would like . . . to go to . . . the hotel . . . PLEASE" is accepted. In addition to requiring linked paths through the banks to be followed, the CPU program may reject individual link combinations that still remain illogical, such as "Bring me . . . the . . . hotel . . . PLEASE". As noted above, polite expressions such as thank you, goodbye, etc., may be stored in a single bank. Such words require no bank linking in order to be accepted for translation.

Figure 8:
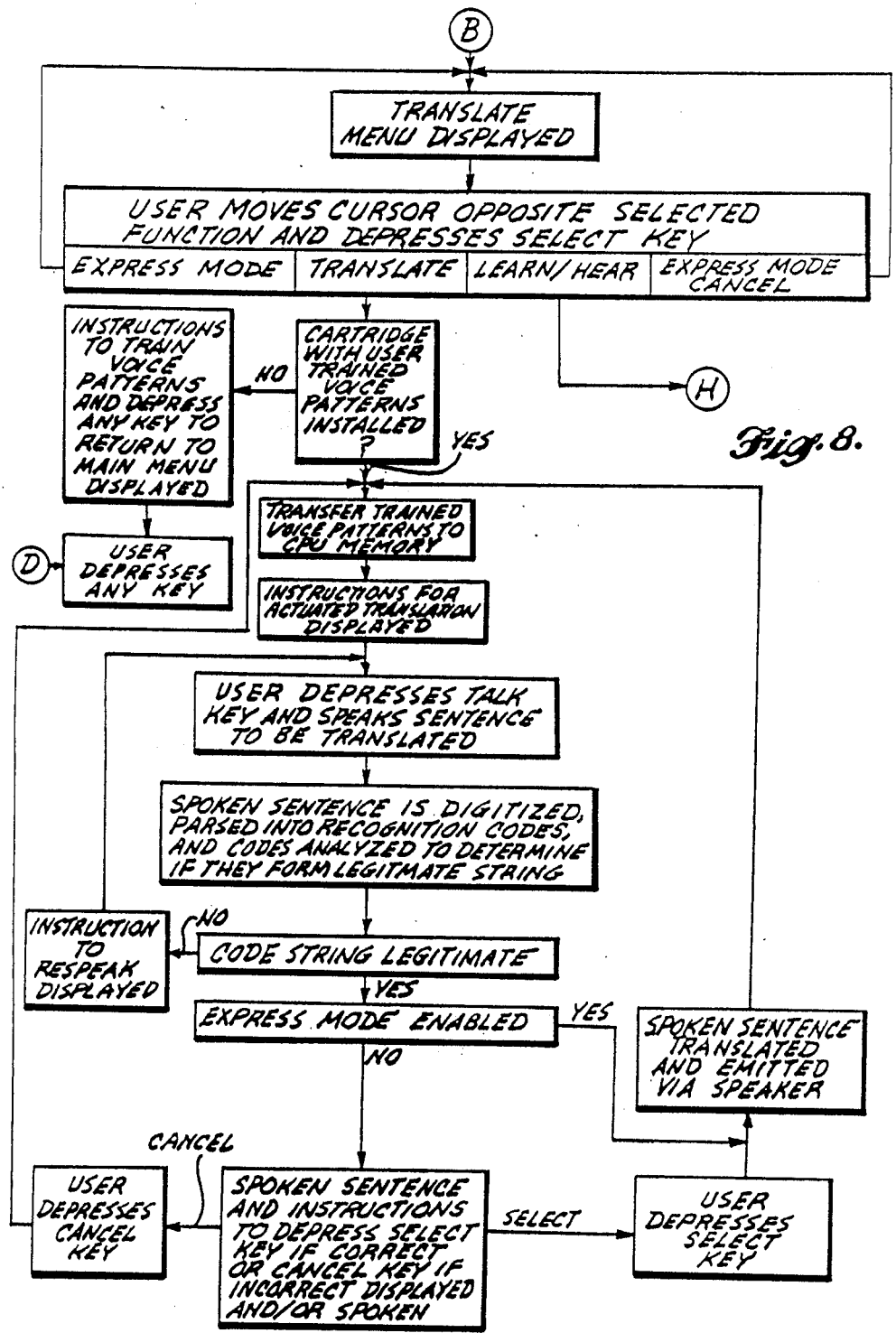

As shown in FIG. 8, if the voice language translator determines that the recognition code string is not legitimate, instructions to respeak are displayed. Thereafter, the user depresses the talk key and respeaks the sentence to be translated. As described above and shown in FIG. 8A, the respoken sentence is digitized, parsed into recognition codes and the codes analyzed to determine if they form a legitimate string.

If the code string is determined to be legitimate, a test of the express mode flag is made. If the express mode flag is set, the spoken sentence is immediately translated and emitted via the speaker 39. Translation involves reading from the ROM memory of the cartridge digitally stored voice patterns that cause the voice synthesizer 47 to produce an audible output in the foreign language comparable to the sentence that was spoken by the user. Thus, the digital code stored in the voice language cartridge RAM 59 is used to determine the nature of the spoken sentence. Foreign language code for a comparable sentence is then read from the cartridge ROM 57 and used to create an audible emission via the voice synthesizer 47 and speaker 39. At the same time, if desired, an audible emission of the sentence in the language of the user can be provided to the user via an ear speaker, or a display of the sentence in the language of the user can be created, for example.

If the express mode flag is not set, the spoken sentence and instructions to depress the select key if correct or cancel key if incorrect are either displayed and/or spoken in the user's language. This allows the user to determine if his spoken sentence has been correctly interpeted prior to the spoken sentence being translated. If the user depresses the cancel key, the program cycles to the point where instructions for voice-actuated translation are displayed. If the user depresses the select key, the spoken sentence is emitted via the speaker in the foreign language. As before, this involves the CPU reading from the ROM memory of the cartridge suitable digitally stored voice patterns and applying them to the voice synthesizer 47.

Figure 9:
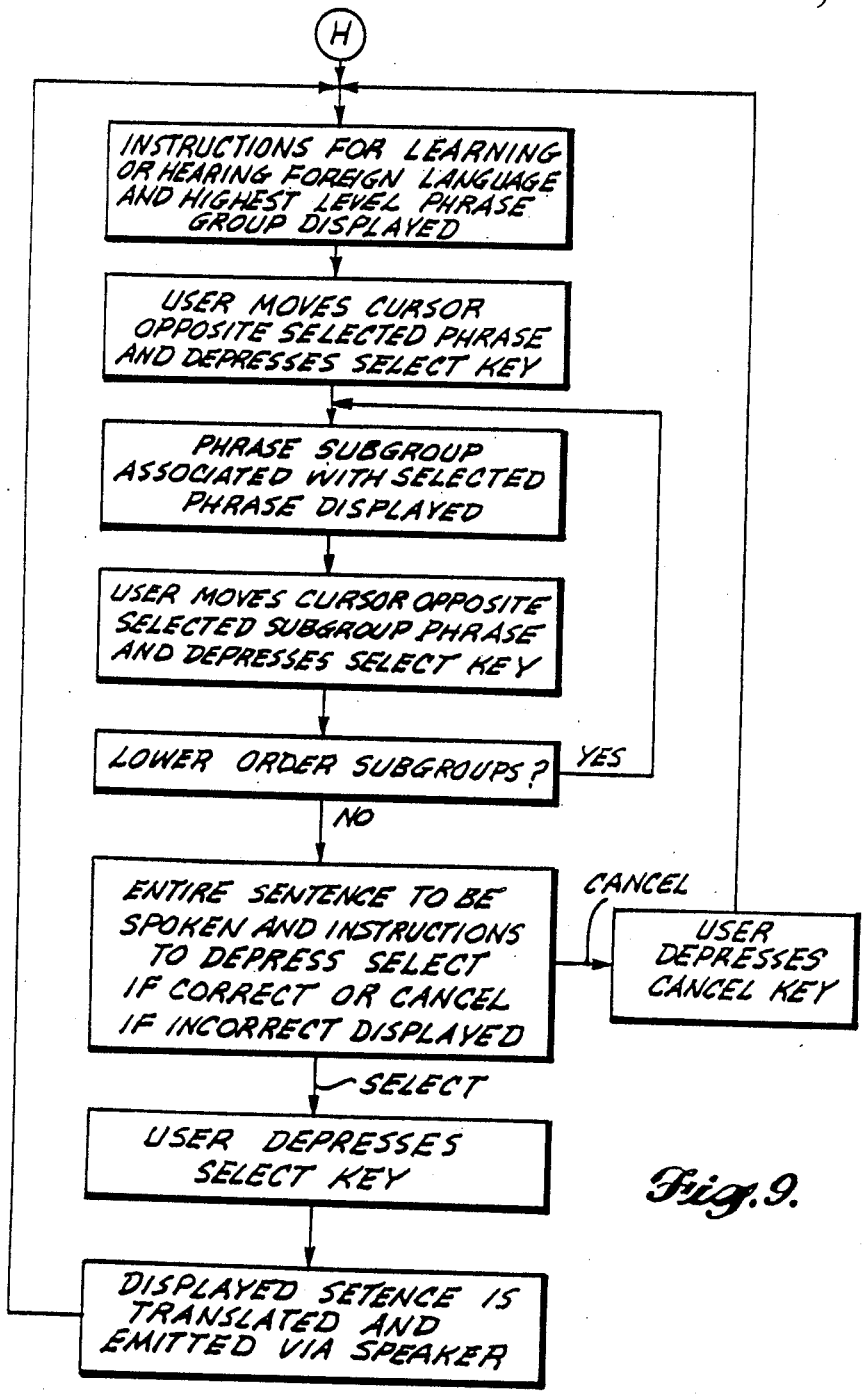

If the user moves the cursor opposite the LEARN/HEAR function and depresses the select key when the translate menu is displayed, as illustrated in FIG. 9, instructions for learning or hearing foreign language and the highest level phrase group to be learned or heard are displayed. In response to the displayed instructions, the user moves the cursor opposite a selected phrase (such as, "Take me to . . . ") and depresses the select key. When this occurs, a phase subgroup associated with the selected phrase is displayed. The user then moves the cursor opposite the selected subgroup phrase (such as, "the . . . train station") and depresses the select key. Then a test is made to determine if lower order subgroups exist. If a lower order subgroup exists for the selected subgroup, the subgroup selections are displayed and a selection made (such as "to Prague"). This cycle is repeated until the lowest order subgroup has been displayed and a selection made. When joined together, the selected highest level phrase group item and the phrase subgroup items form a complete sentence (i.e., "Where is the train to Prague?"). While not illustrated in FIG. 9, if the highest level phrase group and/or the subgroups have more items than can be displayed on a full screen, the cursor keys are used to scroll through the items of each group and subgroup until the desired item is displayed.

After a choice has been made from the lowest order subgroup, the entire phrase to be spoken is displayed along with instructions to depress the select key if correct or cancel key if incorrect. If the user depresses the cancel key, the program cycles to the point where instructions for learning or hearing a foreign language and highest level phrase group are displayed. If the user depresses the select key, the displayed phrase is translated and emitted via the speaker. Consequently, the user can view the sentence to be translated in the user's language while hearing (and, then, speaking) the sentence in the foreign language.

As will be readily appreciated from the foregoing description, the invention provides a voice language translator suitable for implementation in hand-held size. Memory requirements are minimized by banking words and phrases falling in the same category and logically combining the small number of stored words and phrases together to create a large number of sentences, i.e., instructions or questions. As noted above, in one actual embodiment of the invention, approximately 500 stored phrases and words can be combined together to create over 35,000 sentences. Rather than cycling through a large number of stored sentences in order to find the correct sentence, the invention utilizes the voice of a user and the ability of the user to form sentences from words or groups to rapidly and quickly determine the nature of the sentence to be translated. This is accomplished by "personalizing" cartridges to the user's voice so that errors associated with different people speaking different phrases in different ways are avoided. This has the advantage of allowing the translator to be able to pick out the voice of the user and not respond to other voices. This advantage is particularly important when the user is near other people who are also speaking, such as in a crowd.

In accordance with the present invention, foreign language sentences to be spoken are created in two different ways, depending upon the nature of the foreign language sentence. In most instances, foreign language equivalents of the sentence sections spoken by the user are first located and, then, the foreign languages equivalents are combined into a string that forms the sentence to be uttered, i.e., a word-for-word and phrase-for-phrase comparison approach is used. In other instances, particularly instances where the sentence to be translated has a gender overtone, the sentence sections are first combined in the language of the user. Then, the CPU looks for an equivalent foreign language sentence in the cartridge memory. While the algorithms determining which approach is to be used in a particular situation can be stored in the CPU and down loaded into the ROM memory 53, preferably the approach decision algorithms, as well as the combination determining algorithms, are both permanently stored in the language cartridge ROM. Similarly, as noted above, while the voice language translator applications program illustrated in FIGS. 4-9 can be stored in the CPU ROM 53, it is preferably stored in the language cartridge ROM 57.

While a preferred embodiment of the invention has been illustrated and described, it will be appreciated that various changes can be made therein without departing from the spirit and scope of the invention. For example, while storing personalized word patterns in the RAM memory of a removable cartridges is preferred, personalized word patterns could remain stored in the CPU memory and only foreign language words and phrases stored in a ROM-type memory in a cartridge. In such an embodiment, neither a RAM memory nor battery power to maintain a RAM memory in a cartridge is required. Also, user instructions can be spoken in the user's language as an alternative, or in addition, to being displayed in the user's language. Further, a user can train only desired sentences or parts of sentences, rather than all sentences and parts, prior to entering the translation mode of operation. Still further, the voice synthesizer can be replaced with other types of voice producing devices, such as a human speech digitizer, i.e., a system of electronic chips that creates audible sounds from speech stored in digital form rather than analog form. Hence, within the scope of the appended claims, it is to be understood that the invention can be practiced otherwise than as specifically described herein.

The embodiments of the invention in which an exclusive property or privilege is claimed are defined as follows:

1. A speech translator for translating words spoken by a user in a first language into spoken words in a second language, said speech translator comprising:
   language storing means for storing, in digitally coded form, voice patterns of words and phrases in first and second languages, at least some of said digitally coded voice patterns being stored in banks of related words and phrases;
   word recognition means for receiving audible words spoken by a user and creating corresponding voice patterns in digitally coded form;
   word producing means for receiving voice patterns in digitally coded form and creating corresponding audible words; and
   programmable control means connected to said language storage means, said word recognition means and said word producing means for translating words spoken by a user in said first language into spoken words in said second language by controlling the operation of said language storage means, said word recognition means and said word producing means, said programmable control means including a training mode of operation and a translate mode of operation, said training mode of operation training said speech translator to understand words spoken by a user in said first language by: (i) instructing a user to speak a series of words in said first language stored in digitally coded form in said language storage means; and (ii) storing the digitally coded voice patterns produced by said word recognition means in response to said user speaking said series of words in said first language as a series of trained voice patterns, said translate mode of operation translating words spoken by said user in said first language into said second language by: (i) comparing the digitally coded voice patterns, produced by said word recognition means when said user speaks words in said first language, with said stored series of trained voice patterns (ii) using the results of said comparison to locate digitally coded voice patterns of corresponding words in said second language stored in said language storing means; and (iii) applying said digitally coded voice patterns of said corresponding words to said word producing means, said programmable control means only accessing selected ones of said banks of related words and phrases stored in said language storing means in a logical sequence when comparing the digitally coded voice patterns produced by said word recognition means when said user speaks words in said first language with said stored series of trained voice patterns.

2. A speech translator as claimed in claim 1, wherein said voice speech translator includes a display means and wherein said programmable control means causes said display means to display said series of words in said first language when said programmable control means is in said training mode of operation.

3. A speech translator as claimed in claim 2, wherein said training mode of operation includes a TRAIN ALL words option during which a user is instructed to speak in seriatum the series of words in said first language stored in digitally coded form in said language storage means as they are displayed, and a TRAIN SELECTED words option during which a user can select which of said series of words in said first language stored in digitally coded form in said language storage means to speak.

4. A speech translator as claimed in claim 3, wherein said training mode of operation tests the way in which a user speaks a word in said first language by asking the user to repeat the word in said first language and analyzing the digitally coded voice pattern produced by said word recognition means in response to said user repeating said word in said first language to determine if the user has respoken the word in the same way.

5. A speech translator as claimed in claim 4, wherein said display means displays instructions to a user to speak a displayed word or words as the word or words are displayed when said programmable control means is in said training mode of operation.

6. A speech translator as claimed in claim 5, wherein said control means includes a talk key that enables said word recognition means to receive audible words spoken by a user and create corresponding digitally coded voice patterns when said talk key is depressed and wherein said speech translator instructs a user to depress said talk key as well as speak a word or words in said first language when said programmable control means is in said training mode of operation.

7. A speech translator as claimed in claim 6, wherein said control means includes cursor keys and wherein said cursor keys are used to scroll through words displayed by said display means when said programmable control means is in said TRAIN SELECTED words option of said training mode of operation.

8. A speech translator as claimed in claim 1, wherein said programmable controller logically combines the digitally coded voice patterns of words spoken by a user into a sentence and analyzes the sentence to determine if it is a sentence suitable for translation when said programmable control means is in said translate mode of operation.

9. A speech translator as claimed in claim 8, wherein said analysis requires that said sentence lie in a predetermined sequence of banks accessed by said programmable control means when comparing the digitally coded voice patterns produced by said word recognition means when said user speaks words in said first language with said stored series of trained voice patterns.

10. A speech translator as claimed in claim 8 or 9, wherein said analysis requires that said combined sentence terminate with a specific word that is unrelated to the content of the sentence.

11. A speech translator claimed in claim 8 or 9, wherein said digitally coded voice patterns of said spoken words are used to locate digitally coded voice patterns of corresponding words in said second language stored in digitally coded form in said language storing means and apply said digitally coded voice patterns of said corresponding words to said word producing means immediately after said sentence is determined to be suitable for translation.

12. A speech translator as claimed in claim 8 or 9, wherein said sentence is provided to said user in said first language after said sentence is determined to be suitable for translation prior to said digitally coded voice patterns of said spoken words being used to locate digitally coded voice patterns of corresponding words in said second language stored in digitally coded form in said language storing means and apply said digitally coded voice patterns of said corresponding words to said word producing means.

13. A speech translator as claimed in claim 12, wherein said sentence is provided to said user by being displayed on said display means.

14. A speech translator as claimed in claim 12, wherein said sentence is provided to said user by being uttered by said word producing means.

15. A speech translator as claimed in claim 9, wherein said programmable controller displays the words in the banks when the analysis of the words spoken by a user do not find a match.

16. A speech translator as claimed in claim 15, wherein words spoken by a user are analyzed twice and the words in a bank are displayed only if no match is found after both analyses have been completed.

17. A speech translator as claimed in claim 9, wherein said speech translator includes a display means and wherein said user can control during translation the display of words stored in said banks.

18. A speech translator as claimed in claim 8 or 9, wherein said speech translator includes a display means and wherein said programmable control means causes said display said series of words in said first language when said programmable control means is in said training mode of operation.

19. A speech translator as claimed in claims 2, 3, 4, 5, 6, 7, 8, or 9, wherein: (a) said speech translator includes a hand-sized housing; (b) said display means, word recognition means, word producing means and said programmable control means are all mounted in said hand-sized housing; and (c) said language storing means includes at least two cartridges, said cartridges being removably mounted in said hand held-housing.

20. A speech translator as claimed in claim 19, wherein said TRAIN ALL words option instructs a user to speak all of the series of words in said first language stored in digitally coded form in said language storage means as they are displayed.

21. A speech translator as claimed in claim 20, wherein said training mode of operation also includes a TEST option during which a user speaks in said first language words to be tested and the digitally coded voice pattern produced by said word recognition means in response to said user speaking is analyzed to determine if the words spoken by the user are part of a legitimate code string that includes a digitally coded voice pattern stored in said language storage means.

22. A speech translator as claimed in claim 21, wherein said displays instructions to a user to speak a displayed word or words as the word or words are displayed when said programmable control means is in said training mode of operation.

23. A speech translator as claimed in claim 22, wherein said control means includes a talk key that enables said word recognition means to receive audible words spoken by a user and create corresponding digitally coded voice patterns when said talk key is depressed and wherein said speech translator instructs a user to depress said talk key as well as speak a word or words in said first language when said programmable control means is in said training mode of operation.

24. A speech translator as claimed in claim 23, wherein said control means includes cursor keys and wherein said cursor keys are used to scroll through words displayed by said display means when said programmable control means is in said TRAIN SELECTED words option of said training mode of operation.

* * * * *

UNITED STATES PATENT AND TRADEMARK OFFICE
CERTIFICATE OF CORRECTION

PATENT NO. : 4,984,177

DATED : January 8, 1991

INVENTOR(S) : S. A. Rondel et al.

It is certified that error appears in the above-identified patent and that said Letters Patent is hereby corrected as shown below:

ON TITLE PAGE:

| Column | Line | Error |
|---|---|---|
| Item [57] | 52 | Delete "French" and insert therefor --German-- |
| 9 | 29 | After "vehicle" insert --used-- |
| 14 | 22 | Delete "the hotel" and insert therefor --the . . . hotel-- |
| 18 | 68 | After "display" insert --means to display-- |
| 20 | 4 | After "said" insert --display means-- |

Signed and Sealed this

Eighteenth Day of August, 1992

Attest:

DOUGLAS B. COMER

*Attesting Officer*     Acting Commissioner of Patents and Trademarks